(12) United States Patent
Kumakawa

(10) Patent No.: US 6,473,950 B1
(45) Date of Patent: Nov. 5, 2002

(54) METHOD OF MANUFACTURING ELECTRONIC COMPONENT

(75) Inventor: Shiro Kumakawa, Tokyo (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/147,424

(22) PCT Filed: Apr. 30, 1998

(86) PCT No.: PCT/JP98/01978

§ 371 (c)(1),
(2), (4) Date: Dec. 12, 1998

(87) PCT Pub. No.: WO98/50928

PCT Pub. Date: Nov. 12, 1998

(30) Foreign Application Priority Data

May 7, 1997 (JP) ............................................. 9-116778

(51) Int. Cl.[7] ............................ H01G 7/00; H01G 9/07; B32B 27/38
(52) U.S. Cl. .................... 29/25.42; 29/25.41; 428/36.4; 428/418; 361/321.1; 361/321.2; 361/313
(58) Field of Search ............................ 29/25.41, 25.42, 29/830, 739; 428/36.4, 35.8, 418; 361/321.1, 321.2, 321.4, 309, 313

(56) References Cited

U.S. PATENT DOCUMENTS

| | | | | |
|---|---|---|---|---|
| 5,014,158 A | * | 5/1991 | Nishimura et al. | 361/321.2 |
| 5,258,886 A | * | 11/1993 | Murayama et al. | 29/25.42 X |
| 5,505,809 A | * | 4/1996 | Yamamoto et al. | 29/25.42 |
| 5,700,548 A | * | 12/1997 | Warnier et al. | 29/25.42 |
| 5,709,948 A | * | 1/1998 | Perez et al. | 428/418 |
| 5,830,548 A | * | 11/1998 | Andersen et al. | 428/36.4 |

FOREIGN PATENT DOCUMENTS

| | | |
|---|---|---|
| EP | 0 522 622 A1 | 6/1992 |
| GB | 2 110 983 A | 10/1982 |
| JP | 7-93231 | 10/1995 |
| JP | 9213562 | 8/1997 |
| WO | 91/01346 | 2/1991 |

\* cited by examiner

Primary Examiner—Peter Vo
Assistant Examiner—A. Dexter Tugbang
(74) Attorney, Agent, or Firm—Rader, Fishman & Grauer PLLC

(57) ABSTRACT

A manufacturing method for multi-layered electronic parts which is characterized in that from a roll of a polyethylene microporous sheet which has an electrode layer forming agent formed on its surface, contains 45 to 80 volume percent of inorganic filler, and has a thickness of 25 μm or less, tensile strengths of 3 kg/mm$^2$ or more in the longitudinal direction and of 1 kg/mm$^2$ or more in the transverse direction, and an elongation of 30% or less in the MD direction, layered electronic parts are formed via (a) a step of unwinding the sheet, (b) a step of cutting the sheet in a predetermined length, (c) a step of stacking the cut sheets, and (d) a step of cutting the layered structure and efficient production is made possible.

17 Claims, 1 Drawing Sheet

METHOD OF MANUFACTURING ELECTRONIC COMPONENT

PRIOR ART

The present invention relates to a manufacturing method for electronic parts having a fine multi-structure and more particularly to a manufacturing method for multi-layered electronic parts such as a multilayer ceramic capacitor and a multilayer inductor.

BACKGROUND OF THE INVENTION

A multilayer ceramic capacitor which is a most typical example of multi-layered electronic parts includes many stacked dielectric ceramic layers having internal electrodes which are alternately pulled out at the end face of the layered structure. At the end face of the layered structure where the internal electrodes are pulled out, external electrodes are formed.

Although many circuit parts have been miniaturized recently, there are increasing requests also for miniaturizing such a multilayer ceramic capacitor and increasing the capacity thereof. With such a background, multilayer ceramic capacitors are manufactured by stacking very thin green sheets with a thickness of 10 $\mu$m or less at present. To manufacture such capacitors at a higher yield, an art for printing very thin green sheets as mentioned above and stacking them with high precision is necessary.

In this case, since ceramic green sheets are extremely thin, it is necessary to handle them with care so ass to prevent them from getting elongation and being distorted during transporting, printing, and stacking.

Conventionally, each ceramic green sheet is formed by coating ceramic slurry in a fixed thickness on a carrier film such as a polyethylene terephthalate film and drying it. With respect to each thin ceramic green sheet, a so-called "frame sticking method" has been developed, which comprises forming ceramic green sheet on a carrier film as mentioned above, punching it in a predetermined size together with the carrier film, sticking it to a frame structure together with the carrier film, and then performing the subsequent printing and stacking processes.

In the frame sticking method, a ceramic green sheet formed on a carrier film is punched together with the carrier film and sticked with the periphery thereof to a tablet-shaped frame. The frame sticking method sets the frame in a printing machine, prints the electrode pattern on the green sheet, and dries it. In this case, the green sheet is positioned on the basis of the frame and printed. Thereafter, the green sheet is punched together with the carrier film within the frame and set on the compression stand of a soft-compressor. In this case, the green sheet of the lowest layer is put on the soft-compression stand with the carrier film side thereof down, and the next green sheet is loaded on it with the carrier film side thereof up, and the carrier film is torn off. This process is sequentially repeated by a predetermined number of sheets, and then the carrier film of the green sheet of the uppermost layer is left untorn off, and pressure is applied to the layered green sheets from above the carrier film as soft-compression. Thereafter, the soft-compressed layered structure is put into a mold and compressed. Thereafter, the carrier films attached to the uppermost and lowermost layers of the layered-structure are torn off and a layered structure in units of a plurality of electronic parts is completed. With respect to the green sheets stacking order in this case, needless to say, the green sheets are stacked so that, the electrode patterns are alternately pulled out at the end face of the layered structure in each layered chip capacitor.

The multi-layered structure stacked in this way is cut and divided in a chip shape for each electronic part. Furthermore, the internal electrode is exposed from the end face of each chip and each chip is barreled so as that it is hardly cracked and then calcined in a kiln. Thereafter, when an external electrode is coated and baked on each of both end faces of each calcined chip, a multilayer ceramic capacitor is completed.

However, according to the aforementioned "frame sticking method", a step of sticking a green sheet, cut together with carrier film to a frame is necessary, and in this case, operations for gluing to the frame and drying the glue are also necessary, hence troublesome steps are required. Furthermore, a problem arises that since a rack is required to fix frames to be used and the frames are expendables, the running cost is increased. In view of such defects of the conventional "frame sticking method", a green sheet printing and stacking method for printing and stacking green films by precise positioning without using frames, accordingly without performing troublesome frame sticking and an apparatus therefor are disclosed in Japanese Patent Publication 7-93231.

According to the printing and stacking method and apparatus therefor, it is possible to make a hole for positioning in a ceramic green sheet cut together with carrier film, insert a transfer head positioning pin into the positioning hole, hold the green sheet cut in the positioned state with the transfer head together with the carrier film, and to, transfer it onto the printing stand or stacking stand, transfer the green sheet to the printing stand or stacking stand together with the carrier tape by precisely positioning only by the transfer head without using tablet-shaped frames. Moreover, since each green sheet can be held and transferred by the transfer head together with the carrier tape, elongation and distortion will not be generated in the green sheet.

However, even in the printing and stacking method of the aforementioned ceramic green sheet and the apparatus therefor, a carrier film is used to form a ceramic green sheet, and a step of coating and drying ceramic slurry on each carrier film is essential, and the cost is increased. As each green sheet is made thinner, it is very difficult to tear off the sheet from the carrier film in a high quality state without causing cracking, elongation, and distortion. Furthermore, it is necessary to print the electrode layer together with the carrier film for each green sheet cut in a predetermined size and a problem inevitably arises that the loss of a printing agent for each printing is increased.

In Japanese Patent Application Laid-Open 4-500835 (WO91/01346), use of a microporous sheet comprising a polyethylene polymer containing an inorganic filler as a ceramic green sheet for a multilayer ceramic capacitor is disclosed.

However, about a method for using the aforementioned microporous sheet as a ceramic green sheet and creating a layered ceramic capacitor of high quality highly efficiently from the sheet, nothing is described in the patent application and the problems on the method using carrier films are not solved at present.

Problems that the Invention is to Solve

An object of the present invention is to solve the problems of the prior art during manufacture of multi-layered electronic parts such as a multilayer ceramic capacitor or a multilayer inductor using ceramic sheets formed on carrier films and to provide a manufacturing method for multi-layered electronic parts of high quality for simplifying the production steps and improving the yield.

DISCLOSURE OF THE INVENTION

The invention is a manufacturing method for multi-layered electronic parts which is characterized in that from a roll of a polyethylene microporous sheet which has an electrode layer forming agent formed on its surface, contains 45 to 80 volume percent of inorganic filler, and has a thickness of 25 µm or less, tensile strengths of 3 kg/mm² or more in the longitudinal direction and of 1 kg/mm² or more in the transverse direction, and an, elongation of 30% or less in the MD direction, multi-layered electronic parts are formed via (a) a step of unwinding the sheet, (b) a step of cutting the sheet in a predetermined length, (c) a step of stacking the cut sheets, and (d) a step of cutting the layered structure, and furthermore a manufacturing method for multi-layered electronic parts mentioned above wherein the method has (c) a step of compressing the layered structure between (c) the stacking step and (d) the cutting step mentioned above, and furthermore a manufacturing method for multi-layered electronic parts mentioned above wherein the method has (e) a debinder step and (f) a calcination step after (d) the cutting step mentioned above and the present invention is also multi-layered electronic parts manufactured by the aforementioned manufacturing method, especially multilayer ceramic capacitors.

PREFERRED EMBODIMENTS OF THE INVENTION

Figure 1:
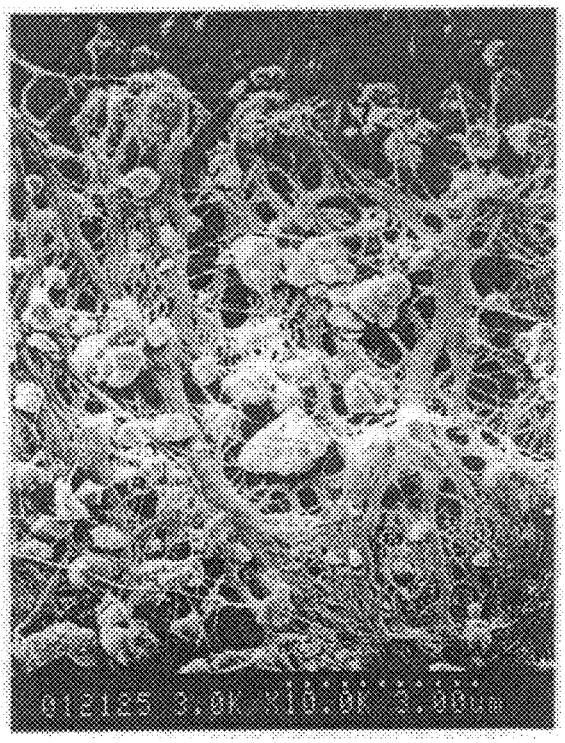
FIG. 1 is an electron microphotograph (magnification× 10,000) viewed from the plane of a polyethylene microporous sheet containing an inorganic filler.

The present invention will be explained hereunder more in detail.

In the manufacturing method for multi-layered electronic parts of the present invention, a roll of a polyethylene microporous sheet containing an inorganic filler is prepared first.

The roll is a fine porous sheet of a polyethylene polymer with a maximum thickness of 25 µm containing 45 to 80 volume percent of inorganic filler, and it is a roll of a green sheet for electronic parts that a sheet on which electrode layers (an electrode layer forming agent) are continuously formed at a predetermined interval at an area occupation rate of 10 to 90% is wound in a roll shape, and the polyethylene of the microporous sheet can be a polyethylene polymer with a molecular weight of $4 \times 10^5$ to $15 \times 10^6$.

The manufacturing method for such a microporous sheet containing an inorganic filler is not particularly limited. However, such a microporous sheet can be manufactured, for example, according to the method described in WO91/01346 (Japanese Patent Application Laid-Open 4-500835) and the disclosure of the specification is incorporated into this specification.

The polyethylene polymer of the present invention is basically ultra-high molecular weight polyethylene, for example, having a weight-average molecular weight of at least $4 \times 10^5$ g/mole, preferably at least $8 \times 10^5$ g/mole.

The high-molecular weight side is not particularly limited but it can be, for example, $15 \times 10^6$ g/mole or less.

The ratio of the weight-average molecular weight to the number-average molecular weight can be a wide value, preferably 10 or less, or more preferably 5 or less.

An inorganic filler to be contained, is selected depending on the function of a target electronic part and is not particularly limited. Every substance which can be sintered itself or such a substance which is added with a mixture, for example, $SiO_2$, $Al_2O_3$, $BaTiO_3$, or $Si_3N_4$ which is mixed with $Y_2O_3$ or SiC which is mixed with a boron compound can be used.

There is no need to limit the content of such an inorganic filler as long as an obtained film-like substance is self-supporting and the more the better. However, the content is generally 45 to 80 volume percent based on the whole of a polyethylene microporous sheet containing an inorganic filler and preferably 50 to 70 volume percent. When it is converted to weight percent, it is nearly equal to 80 to 98 weight percent, preferably 85 to 95 weight percent.

A polyethylene microporous sheet containing an inorganic filler of the present invention is stretched or not stretched, and preferably monoaxially stretched or biaxially stretched. The percent of stretch is 25 times to 400 times and typically 6 times to 20 times in the longitudinal direction and 6 times to 20 times in the transverse direction in biaxial stretch.

The tensile strength is 3 kg/mm² or more in the winding direction (MD direction), preferably 4 kg/mm² or more, and more preferably 6 kg/mm² or more. The tensile strength in the direction (TD direction) perpendicular, to the MD direction is not necessarily high but generally 1 kg/mm² or more, preferably 1.5 kg/mm² or more.

The elongation (elongation at the maximum stress point) is 30% or lower in the MD direction and preferably 20% or lower. The elongation in the TD direction is not particularly limited but generally 200% or lower, preferably 150% or lower. Such a polyethylene microporous sheet containing an inorganic filler of the present invention can be 25 µm or less in thickness, preferably 13 µm or less. These films may be those which are heat treated so as to improve the thermal and/or mechanical properties and the conditions for such heat treatment may be 60 to 120° C. and 0.1 to 2.0 hours in the nitrogen atmosphere.

Figure 2:
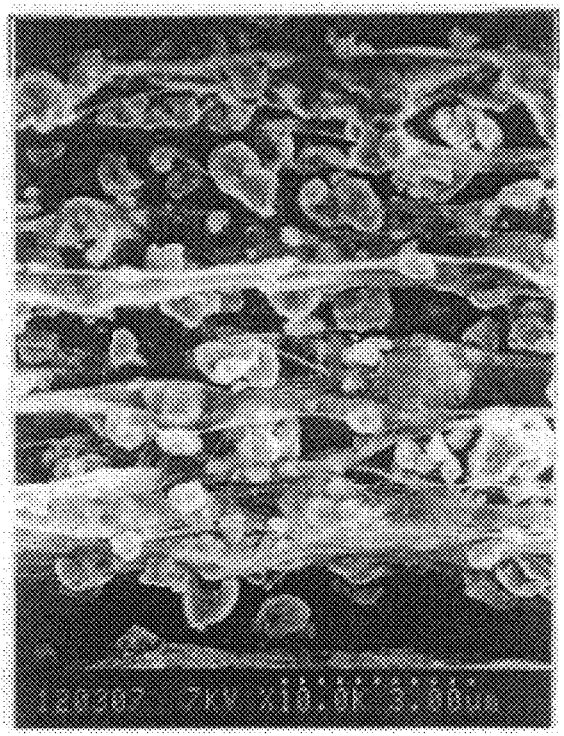
FIG. 2 is an electron microphotograph (magnification× 10,000) viewed from the section of the aforementioned microporous sheet.

With respect to a polyethylene microporous sheet containing an inorganic filler formed in this way, it is desirable that the fine structure thereof is a multilayer nonwoven fabric like. The multilayer nonwoven fabric like is observed as if the sheet is formed by some layers stacked as shown in FIG. 2 as viewed from the section of the sheet though fine fibers with a diameter of about 0.3 to 3 µm are tangled almost evenly as shown in FIG. 1 as viewed from the plane of the sheet. It does not mean always that nonwoven fabrics are formed beforehand and then they are multilayered The roll of the present invention is a roll that an electrode layer forming agent (this can be a precursor of electrode layers or electrode layers) is formed on the aforementioned sheet containing an inorganic filler. Most of such electrode layer forming agents are known in the art of the present invention. For example, one of such agents is an ink-like or paste-like agent containing metallic particles with a diameter of 0.03 to 3 µm and electrode layers can be formed by adjusting it and using the printing method such as screen process printing or gravure or electrode layers also can be directly formed using the vacuum deposition method or sputtering method. In this case, it is desirable that an electrode layer forming agent is formed on the surface of a sheet at a predetermined interval and continuously in both width and length directions of the sheet and it is desirable that the area occupation rate thereof is 10 to 90%.

When the electrode layer forming agent is an electrode layer precursor, it is necessary to process (for example, dry) the agent after forming. Thus, it is necessary to wind it in a roll-shaped state of preferably a winding density of 0.2 to 12 g/cm$^3$. When the winding density is less than 0.2 g/cm$^3$, the productivity is low and the cost becomes high. On the other hand, when the winding density is more than 12 g/cm$^3$, it is not desirable because the winding is tight and electrodes formed on the film surface may be damaged.

With respect to the aforementioned roll, there is the possibility that a solvent having a boiling point of 200° C. or lower gets contaminated in it during the forming process and it is necessary that the content thereof is 5.5 weight percent or less, preferably 1.0 weight percent or less.

The present invention is a method for manufacturing multi-layered electronic parts from the aforementioned roll via (a) a step of unwinding the sheet, (b) a step of cutting the sheet in a predetermined length, (c) a step of stacking the cut sheets, and (d) a step of cutting the layered structure.

It is preferable to put (c') a step of compressing the layered structure between (c) the stacking step and (d) the cutting step mentioned above and more preferable to put (e) a debinder step and (f) a calcination step after (d) the cutting step mentioned above.

The step of unwinding the sheet can use a general method for unwinding a sheet- from a general roll, though it is necessary to control the unwinding tension to 10 kg/m or less.

The unwound sheet in this way is cut in a predetermined length by a cutting means, for example, using a sharp edge and preferably performing sliding motion. In this case, as a matter of course, it is necessary to cut the sheet in consideration of the electrode layer pattern.

Next, the cut sheets are stacked. In this case, it is necessary to stack the cut sheets by positioning the electrode layer pattern of each cut sheet mutually in a predetermined position relationship. The conditions of the stacking step (c) are that the cut sheets are stacked under pressure of 0.5 to 10 MPa, preferably 1 to 4 MPa at 40 to 150° C., preferably 60 to 120° C. for 2 to 10 seconds. The pressure may be applied to each layer or may be applied to some layers stacked or all the layers stacked. When stacking the cut sheets, layers including no electrodes (invalid layers) are stacked on the top and bottom of stacked valid layers including electrodes. The invalid layers may be stacked in a necessary thickness beforehand or may be stacked one by one so as to form stacked electrode layers.

Next, the stacked sheets are dried at 40 to 80° C., preferably 55 to 65° C. in the atmosphere or in the nitrogen atmosphere and the aforementioned layered structure can be subjected to the compression step (c'). The conditions of compression are that the layered structure is compressed under pressure of 1 to 80 MPa, preferably 3 to 50 MPa at 100 to 200° C., preferably 150 to 170° C. for 1 to 10 minutes.

Next, the compressed layered structure obtained in this way is subjected to the cutting step (d). At the cutting step, each multi-layered electronic part or the precursor thereof is formed in consideration of the electrode layer pattern.

According to the present invention, the precursor of multi-layered electronic part obtained above is then subjected to the debinder step (e) of removing polyethylene and the inorganic filler calcination step (f).

The debinder step is executed at 350 to 550° C. for 10 to 150 hours preferably on condition of nonexistence of oxygen, for example, in the nitrogen atmosphere. At the debinder step, a decomposition and combustion reaction may be caused to the binder rapidly at a specific temperature. Therefore, it is desirable to, make a heat analysis of the precursor of multi-layered electronic part beforehand, examine a weight change due to heating, and decide the heating pattern at the debinder step. When polyethylene is to be removed in the nitrogen atmosphere, it is pyrolytically decomposed at 450° C. or so, so that for example, a means for reducing the heating speed between 430 and 470° C. and heating up to 500° C. finally is taken.

The next calcination step is different in the condition thereof depending to the inorganic filler to be used. However, in brief, it is desirable to form an inorganic substance phase by sintering and integrating an inorganic filler. For example, in the case of BaTiO$_3$, the calcination is executed at 900 to 1400° C., preferably 1100 to 1300° C. for 0.5 to 50 hours, preferably 1 to 10 hours. Needless to say, the nonoxygen atmosphere is preferable.

This step is the same step as the step conventionally executed in the manufacturing process of multilayer ceramic capacitors and can be used as it is under the conventional condition. The calcination temperature is greatly different in the condition thereof depending on ceramic powder to be used, so that it is necessary in the same way as with the conventional method to decide an optimum condition for each ceramic powder.

When an external electrode is attached to the calcined product obtained in this way using the standard termination art and technology, a multi-layered electronic part is formed.

EXAMPLES

The present invention will be explained hereunder more in detail by referring to the examples. However, the present invention is not limited to these examples.

Example 1

Ultrahight molecular weight polyethylene (registered trademark of Hizex Million 340M, by Mitsui Sekiyu Kagakukogyo Co., Ltd., molecular weight Mw 3.3×10$^6$) of 10 parts by volume is added to decalin of 30 parts by volume and a suspension A is obtained. On the other hand, barium titanate of 30 parts by volume is added to decalin of 60 parts by volume, and they are further dispersed by a sand mill, and a suspension B is obtained. The two kinds of suspensions A and B are mixed so that a final volume ratio of polymer-:solvent:barium titanate is set to 10:90:30 and the mixed solution is sent to a double-screw extruder with a die and extruded at 170° C., and the obtained film is rapidly cooled in water, and the solvent is removed by drying. Then, the obtained film is biaxially oriented at stretch ratios of 10 times in the lengthwise direction and 10 times in the crosswise direction at 125° C. and a porous film containing an inorganic filler is obtained.

The film is slit in a predetermined width and then an electrode pattern of conductive paste is formed on the surface thereof by the offset printing method. Namely, the pattern consists of areas in units of 7 mm×2 mm, has a rectangular printing part of conductive paste electrode with a size of 6 mm×1 mm at the center of each area, and is continuously printed on the surface of the film. The area occupation rate of electrodes in this case is 43%. Conductive paste contains metallic components of Ag/Pd and the coating amount of conductive paste after drying is 3 mg/cm$^2$.

The film with electrodes printed thereon is wound into a roll in a winding density of 5 g/cm³. Next, the film is unwound and cut in a predetermined length from the roll and the cut films are stacked one by one by shifting the electrode pattern by a half pitch. The valid number of layers is 25 and a film with no electrode printed is used as a last layer. The layered article is heated and compressed at 150° C. and 40 Mpa. The layered film is cut in a size of capacitor and then heated and calcined and a multilayer ceramic capacitor is obtained. The thickness of the valid layers is about 4 µm and the electrostatic capacity is 0.48 µF. The results are shown in Table 1.

Examples 2 and 3 and Comparative Examples 1 and 2

A multilayer ceramic capacitor is obtained in the same way as in Example 1 except that the size of electrodes is changed. The results are shown in Table 1.

Example 4

A multilayer ceramic capacitor is obtained in the same way as in Example 1 except that Solufill(registered tradename)(Holland, by DSM Solutech, Ltd., ceramic powder TAM262L, thickness after calcination 10 µm) is used as a polyethylene film containing barium titanate. The results are shown in Table 1.

TABLE 1

|  | Pattern size (mm × mm) | Electrode size (mm × mm) | Area occupation rate (%) | Valid number of layers (–) | Electrostatic capacity (µF) | Cutting performance |
| --- | --- | --- | --- | --- | --- | --- |
| Example 1 | 7 × 2 | 6 × 1 | 43 | 25 | 0.48 | ○ |
| Example 2 | 7 × 2 | 5.4 × 0.4 | 15 | 25 | 0.17 | ○ |
| Example 3 | 7 × 2 | 6.8 × 1.8 | 87 | 25 | 0.99 | ○ |
| Comparative Example 1 | 7 × 2 | 5.2 × 0.2 | 7 | 25 | 0.03 | ○ |
| Comparative Example 2 | 7 × 2 | 6.9 × 1.9 | 94 | 25 | 1.05 | X |
| Example 4 | 7 × 2 | 6 × 1 | 43 | 25 | 0.19 | ○ |

In Examples 1 to 3, the electrostatic capacity is obtained as calculated respectively in proportion to the electrode occupied area. In Example 4, since the valid layers are thick, the capacity is reduced in accordance with it.

In Comparative Example 1, the capacity is reduced by half compared with the value estimated from the occupied area. The reason is that the valid electrode area is reduced due to dislocation during stacking.

In Comparative Example 2, the yield during cutting is reduced. The reason is that in the pattern of Comparative Example 2, the gaps between the electrodes are only 0.1 mm or less also due to addition of dislocation during stacking and the electrode printed parts are often damaged also due to slight, dislocation during cutting.

What is claimed is:

1. A manufacturing method for fabricating multi-layered electronic parts comprising:
   (a) preparing a roll of a polyethylene microporous sheet having a longitudinal or winding direction and a transverse direction perpendicular to the winding direction, an electrode layer forming agent formed on the surface thereof, containing approximately 45 to approximately 80 volume percent of inorganic filler, having a thickness of approximately 25 µm or less, tensile strengths of approximately 3 kg/mm² or more in the winding direction and of approximately 1 kg/mm² or more in the transverse direction, and an elongation of approximately 30% or less in the winding direction, and a solvent representing approximately 0.0 to approximately 5.5 weight percent of said polyethylene microporous sheet, said layered electronic parts formed by further comprising the following steps:
   (b) unwinding said roll of the polyethylene microporous sheet,
   (c) cutting said polyethylene microporous sheet to a predetermined length,
   (d) stacking said cut polyethylene microporous sheets,
   (e) cutting a layered structure, and
   (f) preparing said polyethylene microporous sheets into a multilayer nonwoven fabric having fibril form substances 0.03 to 3 µm in diameter.

2. A manufacturing method for multi-layered electronic parts according to claim 1, further comprising after the step (d) a step:
   (d') compressing said layered structure.

3. A manufacturing method for multi-layered electronic parts according to claim 1, further comprising after the step (e) the steps:
   (g) debinding said layered structure of polyethylene and
   (h) calcinating said layered structure with an inorganic filler.

4. A manufacturing method for multi-layered electronic parts according to claim 1, wherein said solvent has a boiling point approximately 200° C. or lower.

5. A manufacturing method for multi-layered electronic parts according to claim 4, wherein said roll of polyethlylene microporous sheet has a winding density of approximately 0.2 to approximately 12 g/cm³.

6. A manufacturing method for multi-layered electronic parts according to claim 5, further comprising after the step (d) a step:
   (d') compressing said layered structure.

7. A manufacturing method for multi-layered electronic parts according to claim 5, further comprising after the step (e) the steps:
   (g) debinding said layered structure of polyethylene and
   (h) calcinating said layered structure with an inorganic filler.

8. A manufacturing method for multi-layered electronic parts according to claim 5, further comprising a step:
   (g) debinding said layered structure under the conditions of approximately 25 to approximately 500° C. and approximately 10 to approximately 150 hours in a nitrogen atmosphere.

9. A manufacturing method for multi-layered electronic parts according to claim 5, wherein said electronic parts are multilayer capacitors.

10. A manufacturing method for multi-layered electronic parts according to claim 5, wherein said polyethylene microporous sheet is subjected to heat treatment at approximately 60 to approximately 120° C.

11. A manufacturing method for multi-layered electronic parts according to claim 5, wherein said electrode layer forming agent contains metallic particles, said metallic particles having a diameter of 0.03 to 3 µm.

12. A manufacturing method for multi-layered electronic parts according to claim 1, further comprising a step:
   (g) debinding said layered structure under the conditions of approximately 25 to approximately 500° C. and approximately 10 to approximately 150 hours in a nitrogen atmosphere.

13. A manufacturing method for multi-layered electronic parts according to claim 1, wherein said roll of polyethlylene microporous sheet has a winding density of approximately 0.2 to approximately 12 g/cm$^3$.

14. A manufacturing method for multi-layered electronic parts according to claim 11, wherein said electronic parts are multilayer capacitors.

15. A manufacturing method for multi-layered electronic parts according to claim 11, wherein said polyethylene microporous sheet is subjected to heat treatment at approximately 60 to approximately 120° C.

16. A manufacturing method for multi-layered electronic parts according to claim 11, wherein said electrode layer forming agent contains metallic particles, said metallic particles having a diameter of 0.03 to 3 µm.

17. A manufacturing method for multi-layered electronic parts according to claim 1, wherein said solvent represents approximately 0.0 to approximately 1.0 weight percent of said polyethylene microporous sheet.

\* \* \* \* \*